(12) United States Patent
Wong et al.

(10) Patent No.: US 11,408,557 B2
(45) Date of Patent: Aug. 9, 2022

(54) STRAP HOLDING DEVICE FOR ATTACHMENT TO STRUCTURAL MEMBER FOR HOLDING AN OBJECT

(71) Applicant: SIM DESIGN LIMITED, Hong Kong (HK)

(72) Inventors: Siu Wah Wong, Hong Kong (HK); Yi Chia Chen, Hong Kong (HK); Szu Wen Wang, Hong Kong (HK); Chang Chen Liu, Hong Kong (HK)

(73) Assignee: SIM DESIGN LIMITED, Hong Kong (HK)

( * ) Notice: Subject to any disclaimer, the term of this patent is extended or adjusted under 35 U.S.C. 154(b) by 57 days.

(21) Appl. No.: 16/997,528

(22) Filed: Aug. 19, 2020

(65) Prior Publication Data

US 2021/0054965 A1 Feb. 25, 2021

Related U.S. Application Data

(60) Provisional application No. 62/888,581, filed on Aug. 19, 2019.

(51) Int. Cl.
*F16M 13/02* (2006.01)
*A45F 5/00* (2006.01)
*B62J 11/04* (2020.01)

(52) U.S. Cl.
CPC ............ *F16M 13/022* (2013.01); *A45F 5/00* (2013.01); *B62J 11/04* (2020.02); *A45F 2005/002* (2013.01); *A45F 2200/0583* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,315,641 A | * | 2/1982 | Larsen | A63C 11/2228 280/822 |
| 4,893,381 A | * | 1/1990 | Frankel | A44B 18/00 24/16 R |
| 5,142,743 A | * | 9/1992 | Hahn | B65D 63/10 24/16 R |
| 5,177,986 A | * | 1/1993 | Jensen | A63C 11/021 428/100 |
| 5,214,874 A | * | 6/1993 | Faulkner | A01K 87/00 128/DIG. 15 |
| 5,325,991 A | * | 7/1994 | Williams | A45F 5/02 215/12.1 |
| 5,593,073 A | * | 1/1997 | Finnegan | A44C 5/0007 224/183 |

(Continued)

*Primary Examiner* — Monica E Millner
(74) *Attorney, Agent, or Firm* — Browdy and Neimark, P.L.L.C.

(57) ABSTRACT

The present invention provides a strap holding device for attachment to a structural member for holding a bottle, comprising a strap having a leading portion, a trailing portion and a securing region therebetween. The leading portion forms a holding loop for holding the bottle, and the trailing portion is used to wrap around the structural member for attachment of the device onto the structural member. The strap holding device is releasably attachable to the structural member for safely maintaining the bottle in place during exercise or travel, and is easily removed or withdrawn from the structural member.

17 Claims, 5 Drawing Sheets

(56) References Cited

U.S. PATENT DOCUMENTS

| | | | | |
|---|---|---|---|---|
| 5,603,591 A * | 2/1997 | McLellan | B60P 7/0823 | 224/318 |
| 5,604,961 A * | 2/1997 | Cole | A44B 18/00 | 24/306 |
| 5,617,668 A * | 4/1997 | Shimandle | A01K 83/06 | 43/44.2 |
| 5,806,730 A * | 9/1998 | Deno | A45F 5/02 | 224/148.6 |
| 5,833,188 A * | 11/1998 | Studdiford | B62J 11/04 | 248/229.17 |
| 5,957,141 A * | 9/1999 | Elkins | F16L 3/137 | 132/273 |
| 5,966,865 A * | 10/1999 | Jones | A47G 7/044 | 248/218.4 |
| 5,967,345 A * | 10/1999 | Subotin | A61J 9/0646 | 211/119.007 |
| 5,988,464 A * | 11/1999 | Butler | A45F 3/16 | 224/148.4 |
| 6,032,841 A * | 3/2000 | Johnson | B62J 11/04 | 224/463 |
| 6,138,882 A * | 10/2000 | Buettner | A45C 13/00 | 190/102 |
| 6,145,715 A * | 11/2000 | Slonim | B65D 81/3886 | 224/148.3 |
| 6,606,768 B2 * | 8/2003 | Henry | A45F 5/00 | 24/298 |
| 6,701,580 B1 * | 3/2004 | Bandyopadhyay | B65D 63/10 | 24/16 R |
| 7,946,379 B1 * | 5/2011 | Frenchik | H04R 1/083 | 181/158 |
| 8,458,864 B1 * | 6/2013 | Patton | B65D 63/10 | 24/306 |
| D704,433 S * | 5/2014 | Heap | | D3/213 |
| 9,087,462 B1 * | 7/2015 | Gallus | | G09F 17/00 |
| 9,339,086 B2 * | 5/2016 | Hill | | A44B 11/04 |
| 10,793,216 B2 * | 10/2020 | Avolio | | F16B 2/08 |
| 10,793,329 B2 * | 10/2020 | Grady | | A44B 18/0084 |
| 2004/0104320 A1 * | 6/2004 | Exler | A47G 23/0225 | 248/206.5 |
| 2004/0195254 A1 * | 10/2004 | Bunkers | G09F 23/08 | 220/739 |
| 2004/0245415 A1 * | 12/2004 | Sun | H01F 7/0252 | 248/206.5 |
| 2006/0032032 A1 * | 2/2006 | Cheng | F16L 3/233 | 24/306 |
| 2008/0201915 A1 * | 8/2008 | Obiols | B65D 63/10 | 24/306 |
| 2008/0296325 A1 * | 12/2008 | Tepper | A45F 5/00 | 224/148.6 |

* cited by examiner

STRAP HOLDING DEVICE FOR ATTACHMENT TO STRUCTURAL MEMBER FOR HOLDING AN OBJECT

CROSS-REFERENCE OF RELATED APPLICATION

This application claims benefit of U.S. Provisional Application having Ser. No. 62/888,581 filed on 19 Aug. 2019, which is hereby incorporated by reference herein in its entirety.

FIELD OF THE INVENTION

This invention relates to a portable holding device, and more particularly relates to a strap holding device for holding an object, for example a beverage bottle, that is releasably attachable to a rod-like component or other structural member for safely maintaining the bottle in place during exercise or travel. The strap holding device is easily removed or withdrawn from the rod-like component or other structural member.

BACKGROUND OF THE INVENTION

Various sports activities, generally of a recreational or entertainment nature, are accompanied by having beverages. The sport activities include bicycling, running and hiking. Beverage or water bottles come in a variety of shapes and sizes for designated purposes. It is renowned that bicyclists and long distance runners carry beverage or water bottles for preventing dehydration during long runs, particularly under extreme weather conditions or long distance travel. Many beverage shops have tried to encourage their customers to bring their own reusable container because of the environment concerns. It is becoming more common to carry bottles with home-made beverages because of increased health awareness. Therefore, a bottle holder for securing the bottle to a rod-like component or other structural member is demanding to free one's hands. One type of bottle holders known in the art includes a clamping mechanism, but the clamping mechanism is usually cumbersome in structure, not desirable for storage and carrying by a user.

For the sake of convenience, there is a continuing need for a universal holding device for securing an object of various types (such as beverage bottle, handheld electric fan, mobile phone, umbrella, or handle of shopping bag) to a rod-like or other structural member, such as luggage, a pocketbook, briefcase, backpack, bicycle frame, strollers for kids, a support on vehicles, or a frame in the public area.

SUMMARY OF THE INVENTION

An object of the invention is to provide a strap holding device for attachment to a structural member for holding an object, particularly a bottle, which is lightweight and has compact size for storage and transportation.

Another object of the present invention is to provide a strap holding device for attachment to a structural member for holding an object, particularly a bottle, which provides the easy availability for use and provides an economical and reusable device for efficiently holding a bottle or he like.

A yet object of the present invention is to provide a strap holding device for attachment to a structural member for holding an object, particularly a bottle, which is easily attachable to and detachable from the structural member.

These and other objects and advantages of the invention are satisfied by providing a strap holding device for attachment to a structural member for holding an object comprising:

a substantially flat strap having an affixing end and a free tab end, an inner side surface and an opposed outer side surface, wherein a securing region comprising one or more securing position is disposed on the inner side surface between the affixing end and the tab end of the strap, and wherein a leading portion is defined by the securing region and the affixing end, and a trailing portion is defined by the securing region and the tab end;

securing means for securing the affixing end of the strap at a selected one of the securing positions in the securing region so that the leading portion defines a holding loop for holding the object; and fastener means for releasably fastening the tab end of the strap at a selected fastening position on the outer side surface of the leading portion of the strap so as to attach the strap holding device to the structural member in place after the trailing portion of the strap wraps around the structural member.

The strap holding device is particularly suitable for attachment to a rod-like component or a strap-like member for securely holding and carrying a beverage or water bottle in place.

In certain embodiments, the securing means may be configured to detachably secure the affixing end of the strap at the selected securing position in the securing region to define the holding loop of variable dimensions for adaption of holding the bottle of different sizes and diameters. In alternative embodiments; the holding loop may be permanently formed for holding the bottle of a specific model by adhesive or stitching.

In certain embodiments, a plurality of spaced-apart protrusions may be mounted to the inner side surface of the leading portion of the strap for facilitating securement of the object to the holding loop. The protrusions may be longitudinal in shape or other suitable shapes. In alternative embodiments, the inner side surface of the leading portion of the strap may be configured to incorporate a friction material to increase an opposing surface friction between the inner side surface and the object. The friction material may include pad printing and/or silicon printing in the form of patterns selected from a group consisting of dots, lines, wave, dotted line, characters, and numbers.

In certain embodiments, a plurality of spaced-apart protrusions may be mounted to the inner side surface of the trailing portion of the strap for facilitating securement of the structural member to the strap holding device. The protrusions may be longitudinal in shape or other suitable shapes. In alternative embodiments, the inner side surface of the trailing portion of the strap may be configured to incorporate a friction material to increase an opposing surface friction between the inner side surface and the structural member. The friction material may include pad printing and/or silicon printing in the form of patterns selected from a group consisting of dots, lines, wave, dotted line, characters, and numbers.

In certain embodiments, the fastening means may be in the form of a releasable fastener means that provides variable fastening positions on the outer side surface of the trailing portion. The fastener means may be selected from the group consisting of hook and loop type fasteners, buttonhole and button type fasteners, cinches, buckles and snap-fasteners.

According to the preferred embodiments of the invention, the strap may be made of a stretch material selected from a group consisting of neoprene, a neoprene composite material, spandex, thermoplastic elastomer, and silicone, to permit the reception of the bottle.

The strap holding device of the invention allows to accommodate indicia such as advertising slogans or phrases or commercial logos on the outer side surface of the strap. Preferably the advertising slogans or phrases or commercial logos are placed or imprinted by pad printing or silicon printing.

These and other objects, features and advantages will become apparent upon a perusal of the following detailed description of the preferred embodiments and the accompanying drawings.

DETAILED DESCRIPTION OF THE PREFERRED EMBODIMENTS

While this invention is illustrated and described in preferred embodiments, the strap holding device may be produced in many different configurations, sizes, forms and materials.

Figure 1A:
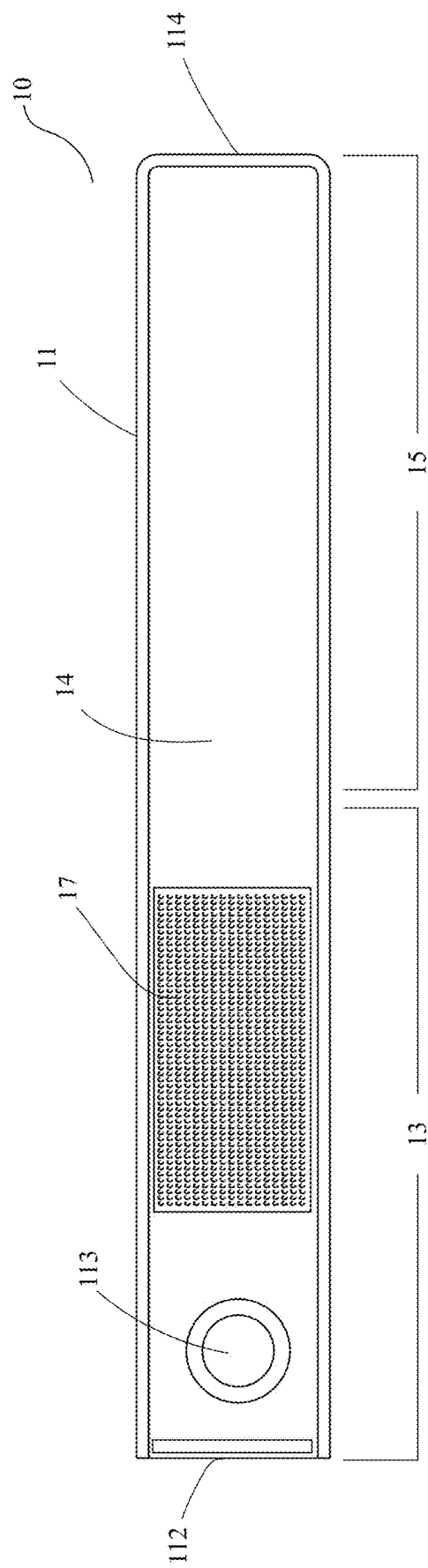
FIG. 1A is an elevation view of an outer side surface of a strap holding device constructed consistent with a preferred embodiment of the present invention in its substantially flat configuration.
Figure 1B:
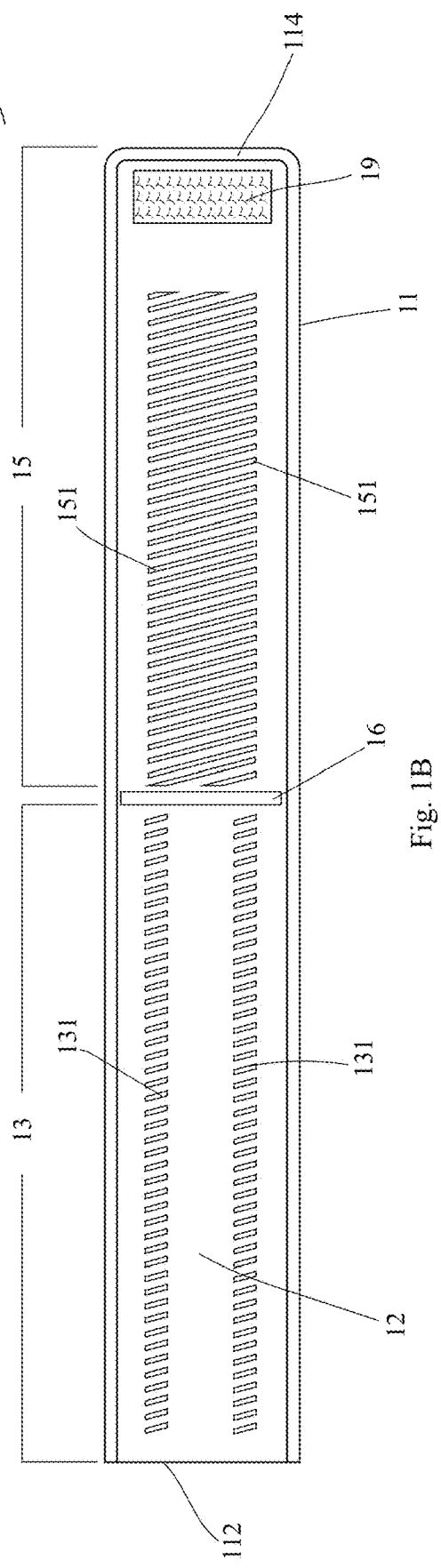
FIG. 1B is an elevation view of inner side surface of the strap holding device of FIG. 1A in the substantially flat configuration.
Figure 2:
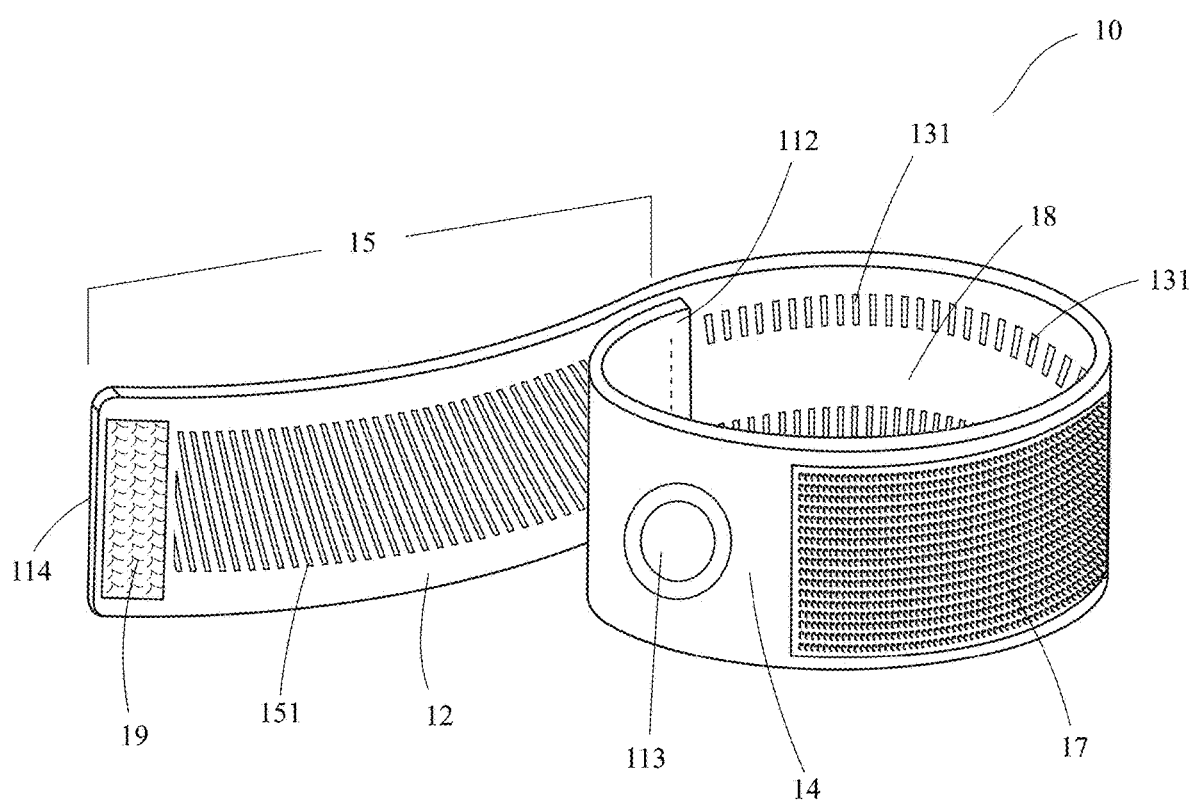
FIG. 2 is a perspective view of the strap holding device of FIGS. 1A and 1B in its active configuration.

Now turning to the figures, illustrated in FIGS. 1A, 1B and 2 is a strap holding device 10 constructed in accordance with an embodiment of the invention. It should be noted that the figures are prepared schematically and out of scale.

As an exemplary strap holding device of the invention, the strap holding device 10 comprises a substantially flat strap 11 having an affixing end 112 and a free tab end 114. The strap holding device 10 further comprises an inner side surface 12, an opposed outer side surface 14 and a securing region 16 on the inner side surface of the middle section of the strap 11 between the affixing end 112 and the free tab end 114. The securing region 16 and the affixing end 112 defines a leading portion 13 which serves as a holding part of the strap 11. The securing region 16 and the tab end 114 defines a trailing portion 15 which serves as an attachment part of the strap 11.

The strap 11 is a single piece of a stretch material. The stretchability allows the length of the strap 11 to be stretched for easy implementation of attachment of the device 10 to the structural member. Examples of the stretch material are selected from a group consisting of neoprene fabric, a neoprene composite material, spandex, thermoplastic elastomer, and silicone. Preferred is neoprene fabric or a neoprene composite material because they are scratch-resistant and weather-resistant, which makes it ideal for outdoor use. The neoprene composite material may be a composite of neoprene and Lycra, Jersey, Terry, nylon, or polyester.

As illustrated in FIG. 2, the leading portion 13 is bent towards the inner side surface 12 with the affixing end 112 stitched on the securing region 16 to define a holding loop 18 for securely holding an object, e.g. a bottle. The trailing portion 15 remains the flat deployed configuration in the ready-for-use state shown in FIG. 2. In the illustrated embodiment, the affixing end 112 is permanently affixed onto the securing region 16 by stitching, therefore the resultant holding loop 18 is not adjustable for its internal diameter. The holding loop 18 matches the overall cylindrical shape of a water battle of specific model to be held by the strap holding device 10.

To assist in gripping the water bottle, the inner surface of the holding loop 18, i.e. the inner side surface 12 of the leading portion 13 may incorporate high friction materials 131 to help to reduce displacement of the water bottle within the holding loop 18. The high friction material 131 includes silicon printing in the form of patterns selected from a group consisting of dots, lines, wave, dotted line, characters, numbers, or any combination thereof. The high friction materials 131 increase the opposing surface friction between the inner surface of the holding loop 18 and the outer cylindrical surface of the water bottle. Alternatively, a plurality of longitudinal protrusions may be mounted to and spaced about the inner surface of the holding loop 18, i.e. formed on the entire length of the inner side surface of the leading portion 13 to provide resistance and grip force to the water bottle for facilitating securement of the bottle to the holding loop.

In some cases, rather than the stitching, the holding loop 18 is permanently formed by adhesive to have a fixed size in order to fit for snugly holding the bottle of specific model.

The holding loop 18 illustrated in FIG. 2 is not adjustable for its internal diameter. However it is possible to construct the holding loop having the capability of accommodating bottles of various sizes and diameters. For this purpose, two or more securing positions are provided in the securing region 16, and correspondingly the strap holding device 10 comprises an attachable securing means for securing the affixing end 112 of the strap 11 at a selected one of the securing positions in the securing region 16. The securing means may be selected from hook and loop type fasteners, buttonhole and button type fasteners, cinches, buckles and snap-fasteners.

Still with reference to FIGS. 1A, 1B and 2, the strap holding device 10 further comprises fastener means for releasably fastening the tab end 114 of the strap 11 onto the outer side surface 14 of the leading portion 13 of the strap 11. In this embodiment, the fastener includes a loop fastener patch 17 stitched on the outer side surface 14 of the leading portion 13, and a hook fastener patch 19 stitched in vicinity of the tab end 114 on the inner side surface 12 of the trailing portion 15. The trailing portion 15 of the strap 11 is bent or folded towards the loop fastener patch 17 to allow for engagement of the loop fastener patch 17 with the hook fastener patch 19 for mounting and attachment of the strap holding device 17 to the structural member, for example, a rod-like component or a strap-shaped member. The hook and loop type fasteners provide the flexibility of attachment to the structural member of various sizes and shapes.

Like the leading portion 13, in order to assist in gripping the structural member, the inner side surface 12 of the trailing portion 15 may incorporate high friction materials 151 to help to reduce displacement of the structural member within a space defined by the trailing portion 15 and the outer side surface 14 of the holding loop 18. The high friction material 151 includes silicon printing in the form of patterns selected from a group consisting of dots, lines, wave, dotted line, characters, numbers or any combination thereof. The high friction materials 151 increase the opposing surface friction between the inner side surface 12 of the trailing portion 15 and the outer surface of the structural member. Alternatively, a plurality of longitudinal protrusions may be mounted to the inner surface of the inner side surface 12 of the trailing portion 15 for facilitating attachment of the strap holding device 10 to the structural member.

The outer side surface 14 of the strap 11 is flat and may be of such dimensions as to accommodate various types of indicia 113, lettering or designs like stickers, company logos, advertising slogans and phrases, markings, and artistic ornamentation. In an alternative embodiment, the indicia 113, lettering or designs like stickers, company logos, advertising slogans and phrases, markings, and artistic ornamentation are placed by silicon printing.

Applications of the strap holding device 10 of the present invention are illustrated in FIGS. 3 to 6B for securely holding a water bottle 20 to a rod-like component or a strap-shaped member of the backpack.

Figure 3:
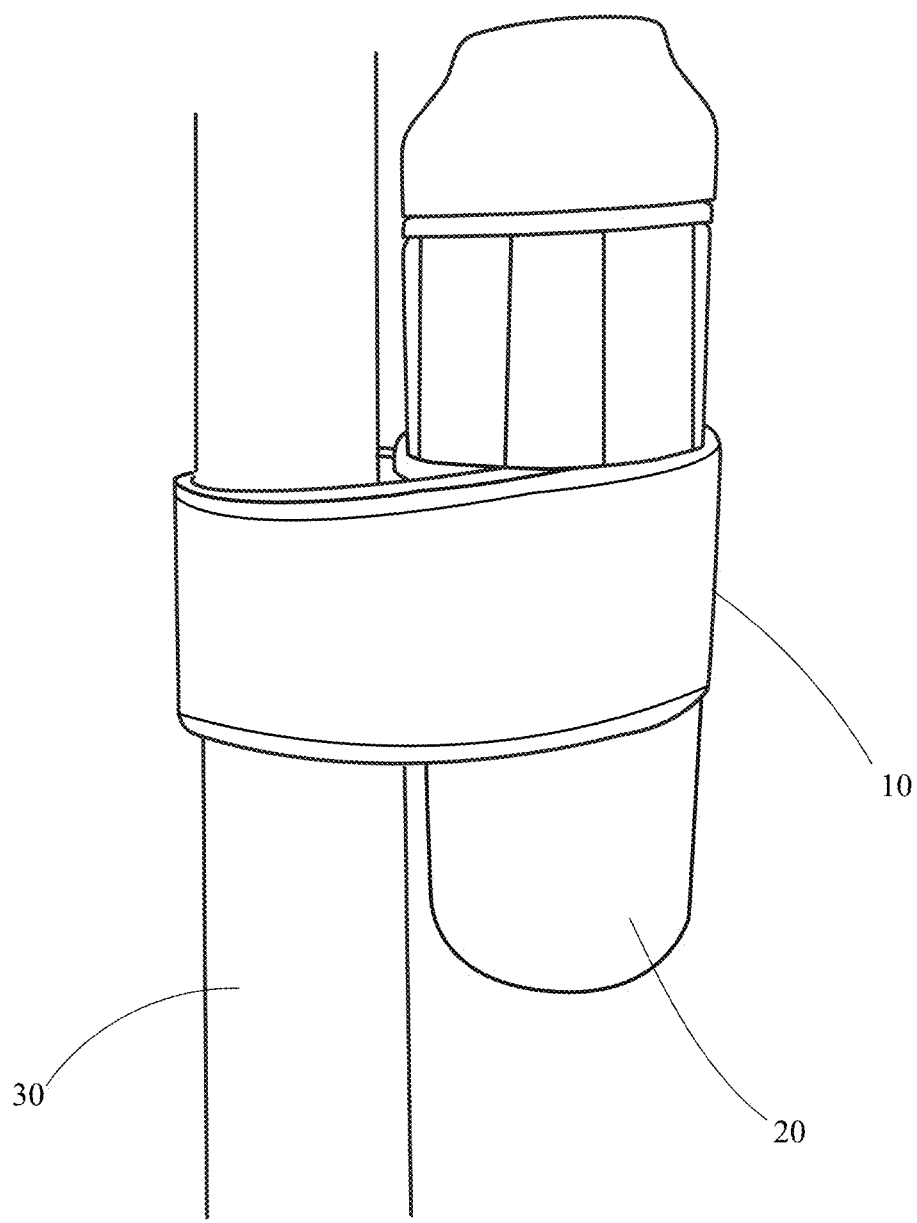
FIG. 3 is a perspective view showing the strap holding device of FIGS. 1A and 1B in use, which attaches to a vertical rod for holding a bottle.

FIG. 3 is a perspective view showing the strap holding device 10 in use. As shown, a bottle 20 is held in the holding loop 18. The trailing portion 15 wraps around a vertical rod 30 which runs through an opening defined by the trailing portion 15 and the outer side surface 14 of the holding loop 18 for attachment of the strap holding device 10 to the vertical rod 30.

Figures 4A, 4B:
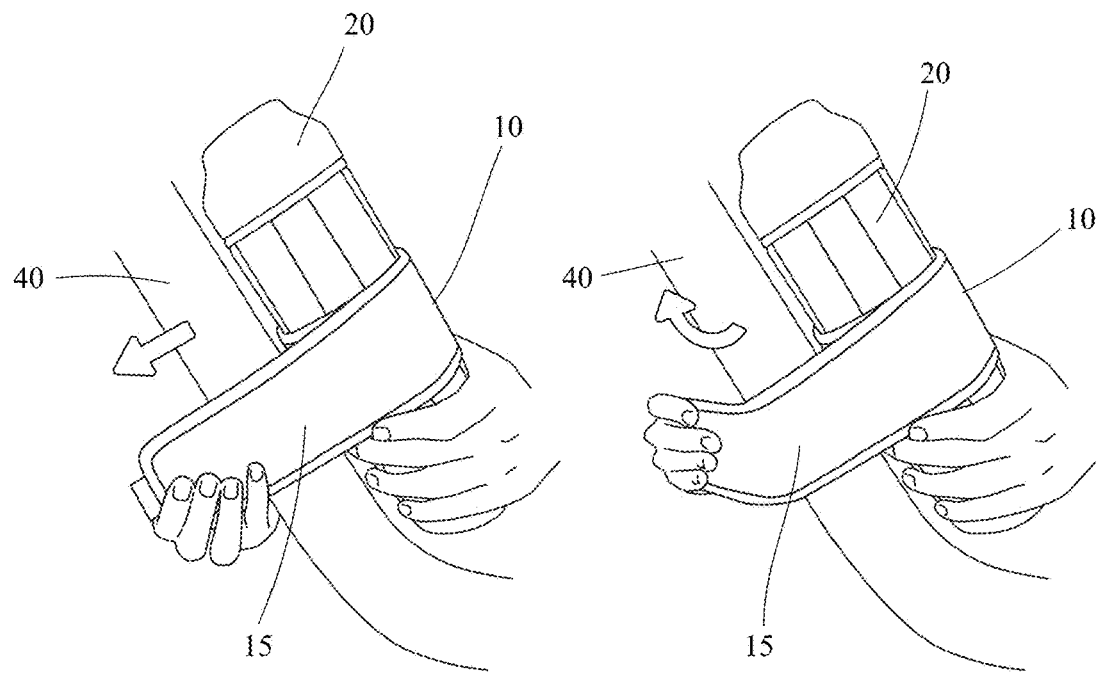
FIG. 4A shows the strap holding device with a bottle is ready for attachment to a down tube of the bicycle frame.
FIG. 4B shows the strap holding device with the bottle is wrapping around the down tube of the bicycle frame for attachment thereto.
Figure 5:
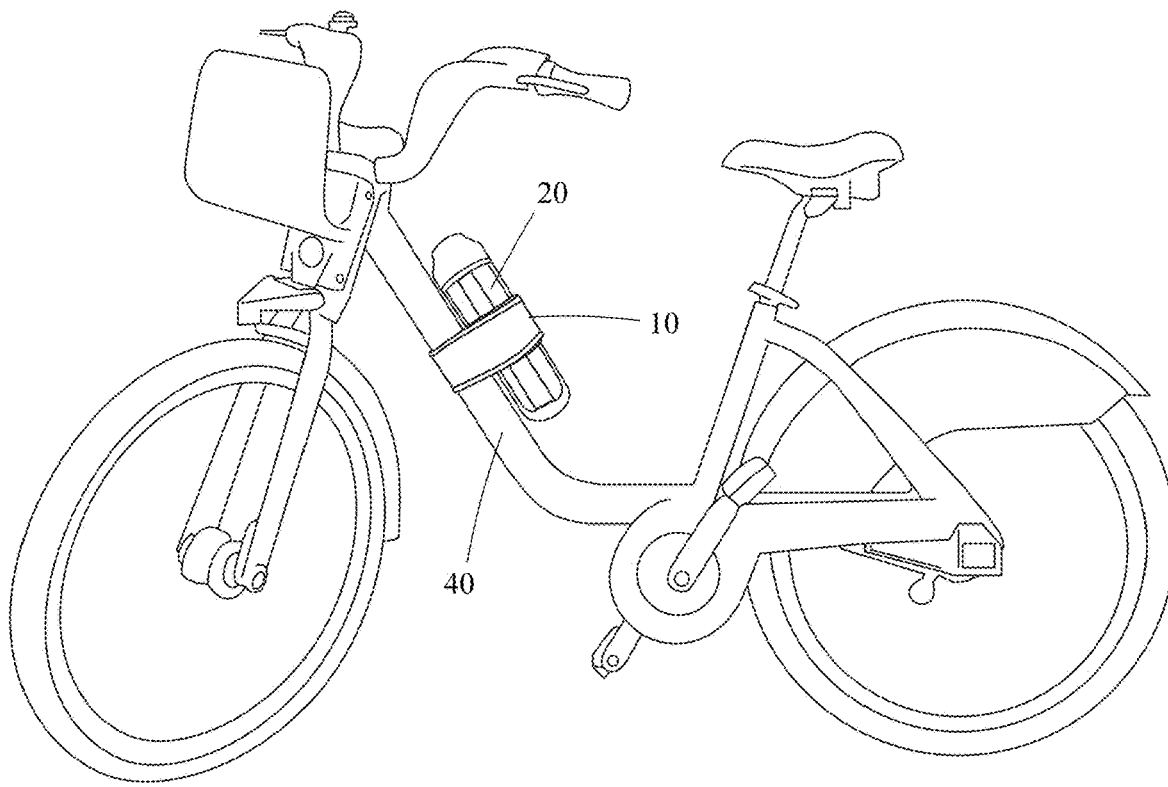
FIG. 5 shows the strap holding device with the bottle in use on the bicycle.

Now turning to FIGS. 4A, 4B and 5, there is illustrated the strap holding device 10 attached to a down tube 40 of the bicycle frame. As illustrated, the bottle 20 is inserted into the holding loop 18 and held in place. The flat deployed trailing portion 15 wraps around the down tube 40 for attachment of the strap holding device 10 onto the down tube 40 and securely maintains the strap holding device 10 after the engagement of the hook fastener patch 19 adjacent to the tab end 114 with the loop fastener patch 17 on the outer side surface 14 of the leading portion 13 (see FIG. 5).

Figure 6A:
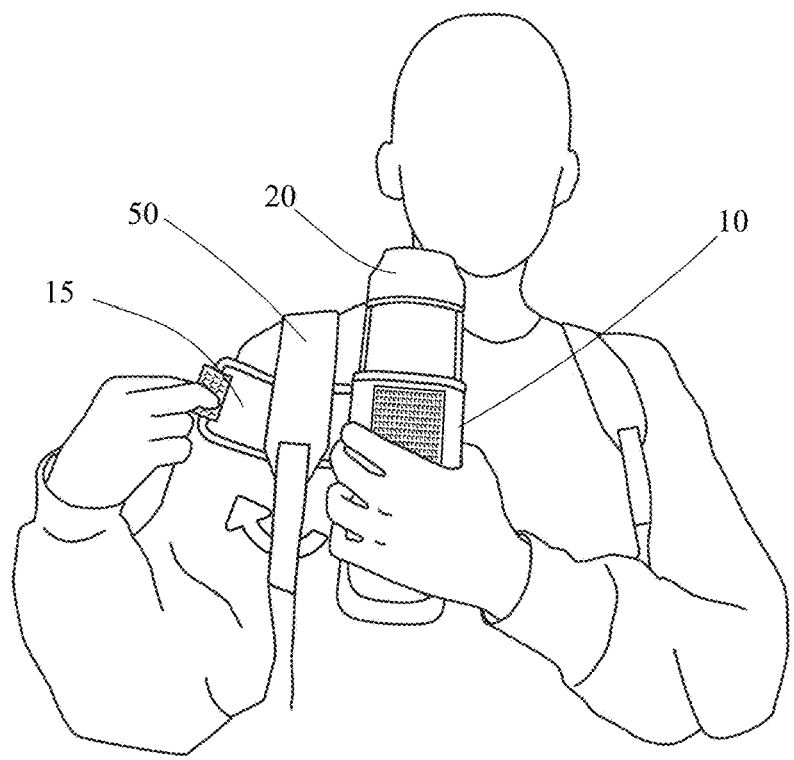
FIG. 6A shows the strap holding device with a bottle is ready for attachment to a strap-shaped member of the backpack.
Figure 6B:
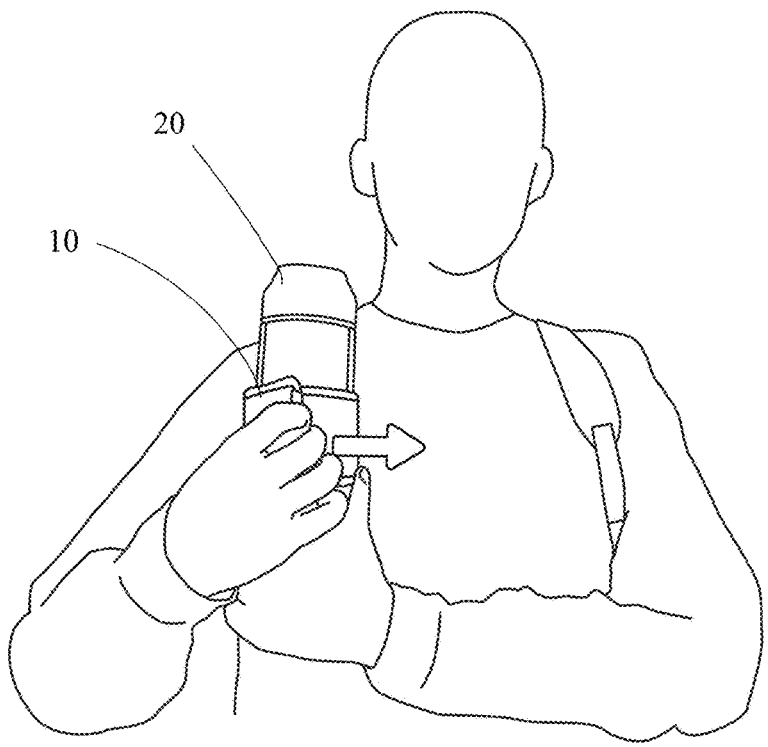
FIG. 6B shows the strap holding device with the bottle wraps around the strap-shaped member of the backpack for holding the bottle.

FIGS. 6A and 6B illustrate the strap holding device 10 is used to maintain the bottle 20 to the strap-shape member 50 of a backpack. The bottle 20 is inserted into the holding loop 18 and held in place. Then the flat deployed trailing portion 15 passes through a passageway defined by the strap-shape member 50 and a user' chest, and folded to wrap around the strap-shape member 50 for attachment of the strap holding device 10 onto the strap-shape member 50 and securely maintains the strap holding device 10 after the engagement of the hook fastener patch 19 adjacent to the tab end 114 with the loop fastener patch 17 on the outer side surface 14 of the leading portion 13 (see FIG. 6B).

Thus, the invention provides a strap holding device for attachment to a structural member for holding the bottle. The strap holding device is adapted for easy and quick mounting to, and dismounting from, the structural member, particularly the rod-like component and the strap-like member. The strap holding device allows the user to have his or her hands free during physical activities such as walking, hiking, bicycling and running as the bottled water or beverage is configured for attachment to an article of the user, so that the user has the bottle handy and readily available for use.

While the embodiments described herein are intended as exemplary fibrous membrane and its production as well as the filter comprising the fibrous membrane, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

What is claimed is:

1. A strap holding device for attachment to a structural member for holding an object comprising:
    a substantially flat strap having an affixing end and a free tab end, an inner side surface and an opposed outer side surface, wherein a securing region comprising one or more securing position is disposed on the inner side surface of a middle section of the strap between the affixing end and the tab end of the strap, and wherein a leading portion is defined by the securing region and the affixing end, and a trailing portion is defined by the securing region and the tab end;
    securing means for securing the affixing end of the strap at a selected one of the securing positions in the securing region so that the leading portion defines a holding loop for holding the object; and
    fastener means for releasably fastening the tab end of the strap at a selected fastening position on the outer side surface of the leading portion of the strap so as to attach the strap holding device to the structural member in place after the trailing portion of the strap wraps around the structural member.

2. The strap holding device according to claim 1, wherein the structural member is a rod-like component or a strap-like member, and the object for holding in the holding loop is a bottle.

3. The strap holding device according to claim 2, wherein the securing means is configured to detachably secure the affixing end of the strap at the selected securing position in the securing region to define the holding loop of variable dimensions for adaption of holding the bottle of different sizes and diameters.

4. The strap holding device according to claim 2, wherein the holding loop is permanently formed for holding the bottle of a specific model.

5. The strap holding device according to claim 4, wherein the affixing end of the strap is permanently secured to the securing region by adhesive or stitching.

6. The strap holding device according to claim 1, wherein a plurality of spaced-apart protrusions are mounted to the inner side surface of the leading portion of the strap for facilitating securement of the object to the holding loop.

7. The strap holding device according to claim 1, wherein the inner side surface of the leading portion of the strap is configured to incorporate a friction material to increase an opposing surface friction between the inner side surface and the object.

8. The strap holding device according to claim 7, wherein the friction material includes pad printing and/or silicon printing in the form of patterns selected from a group consisting of dots, lines, wave, dotted line, characters, and numbers.

9. The strap holding device according to claim 1, wherein a plurality of spaced-apart protrusions are mounted to the inner side surface of the trailing portion of the strap for facilitating securement of the structural member to the strap holding device.

10. The strap holding device according to claim 1, wherein the inner side surface of the trailing portion of the strap is configured to incorporate a friction material to increase an opposing surface friction between the inner side surface and the structural member.

11. The strap holding device according to claim 10, wherein the friction material includes pad printing and/or silicon printing in the form of patterns selected from a group consisting of dots, lines, wave, dotted line, characters, and numbers.

12. The strap holding device according to claim 1, wherein the fastening means is a releasable fastener means that provides variable fastening positions on the outer side surface of the trailing portion.

13. The strap holding device according to claim 12, wherein the fastener means is selected from the group consisting of hook and loop type fasteners, buttonhole and button type fasteners, cinches, buckles and snap-fasteners.

14. The strap holding device according to claim 1, wherein the strap is made of a stretch material.

15. The strap holding device according to claim 14, wherein the stretch material is selected from a group consisting of neoprene, a neoprene composite material, spandex, thermoplastic elastomer, and silicone.

16. The strap holding device according to claim 1, wherein advertising slogans or phrases or commercial logos are placed or imprinted on the outer side surface of the strap.

17. The strap holding device according to claim 16, wherein the advertising slogans or phrases or commercial logos are placed by pad printing or silicon printing.

* * * * *